United States Patent [19]

Oppenlander et al.

[11] Patent Number: 4,567,780

[45] Date of Patent: Feb. 4, 1986

[54] HAND-HELD PIPETTE WITH DISPOSABLE CAPILLARY

[75] Inventors: Jon E. Oppenlander, Lafayette; Bruce R. Koball, Berkeley; Carl L. Shackelford, San Pablo; Benn Karne, Oakland, all of Calif.

[73] Assignee: American Hospital Supply Corporation, Evanston, Ill.

[21] Appl. No.: 588,921

[22] Filed: Mar. 12, 1984

[51] Int. Cl.⁴ ............................................. G01N 1/14
[52] U.S. Cl. ................................... 73/864.16; 422/100
[58] Field of Search ............ 73/864.16, 864.17, 864.18; 422/100

[56] References Cited

U.S. PATENT DOCUMENTS

| | | | |
|---|---|---|---|
| 3,757,585 | 9/1973 | Heller | 73/864.18 |
| 3,827,305 | 8/1974 | Gilson et al. | 73/864.18 |
| 3,918,308 | 11/1975 | Reed | 73/864.14 |
| 4,054,062 | 10/1977 | Branham | 73/864.14 |
| 4,084,730 | 4/1978 | Franke et al. | 73/864.14 X |
| 4,086,062 | 4/1978 | Hach | 422/100 |
| 4,096,750 | 6/1978 | Sturm | 73/864.18 |
| 4,096,751 | 6/1978 | Withers et al. | 73/864.18 |
| 4,229,413 | 10/1980 | d'Autry | 73/864.18 X |
| 4,362,063 | 12/1982 | d'Autry | 73/864.18 X |
| 4,395,921 | 8/1983 | Oppenlander | 73/864.18 |
| 4,399,712 | 8/1983 | Oshikubo et al. | 73/864.16 |
| 4,435,989 | 3/1984 | Meyer et al. | 73/864.18 X |
| 4,442,722 | 4/1984 | Meyer | 73/864.18 |
| 4,470,317 | 9/1984 | Sabloewski et al. | 73/864.18 X |
| 4,487,081 | 12/1984 | De Vaughn et al. | 73/864.16 X |
| 4,489,618 | 12/1984 | Meyer | 73/864.16 |

Primary Examiner—Robert Spitzer
Attorney, Agent, or Firm—James F. Mitchell

[57] ABSTRACT

A hand-held manually operated pipette having an adjustable plunger stroke and calibrated electronic digital volumetric display draws-up and dispenses viscous, dense or high vapor pressure liquids by means of an easily replaced, disposable, integral, positive displacement type plunger tip and capillary assembly. The pipette in another form utilizes a disposable air displacement capillary. The plunger adjustably strokes to a first stop in a first mode for calibration or sample draw-up and dispensing with the volume of pipette liquid contents continuously displayed. In a second mode an overtravel arrangement enables the plunger shaft to stroke beyond the first stop to permit collet type attachment and ejection of the integral plunger tip and capillary for positive displacement service or to eject an air displacement capillary.

18 Claims, 14 Drawing Figures

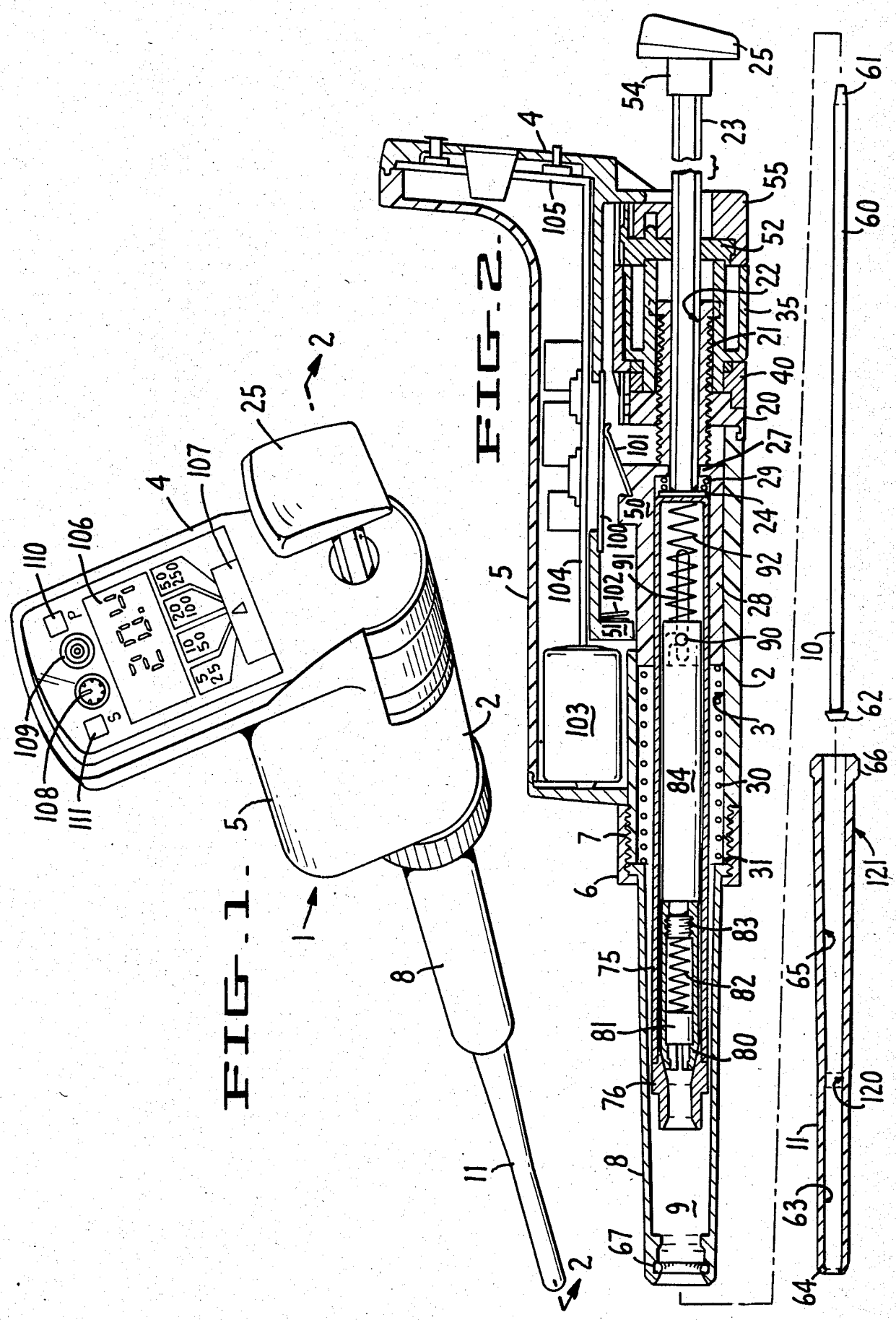

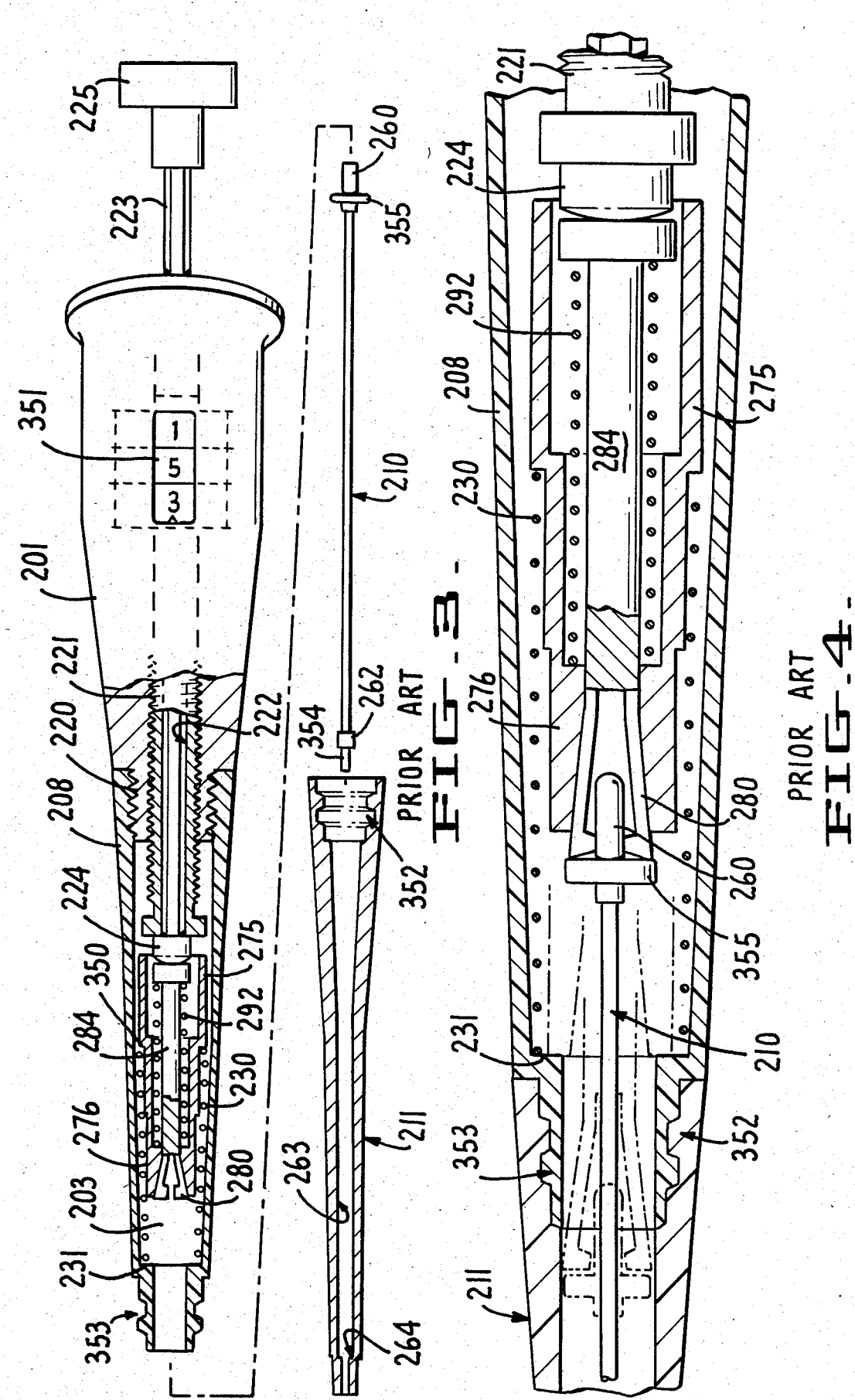

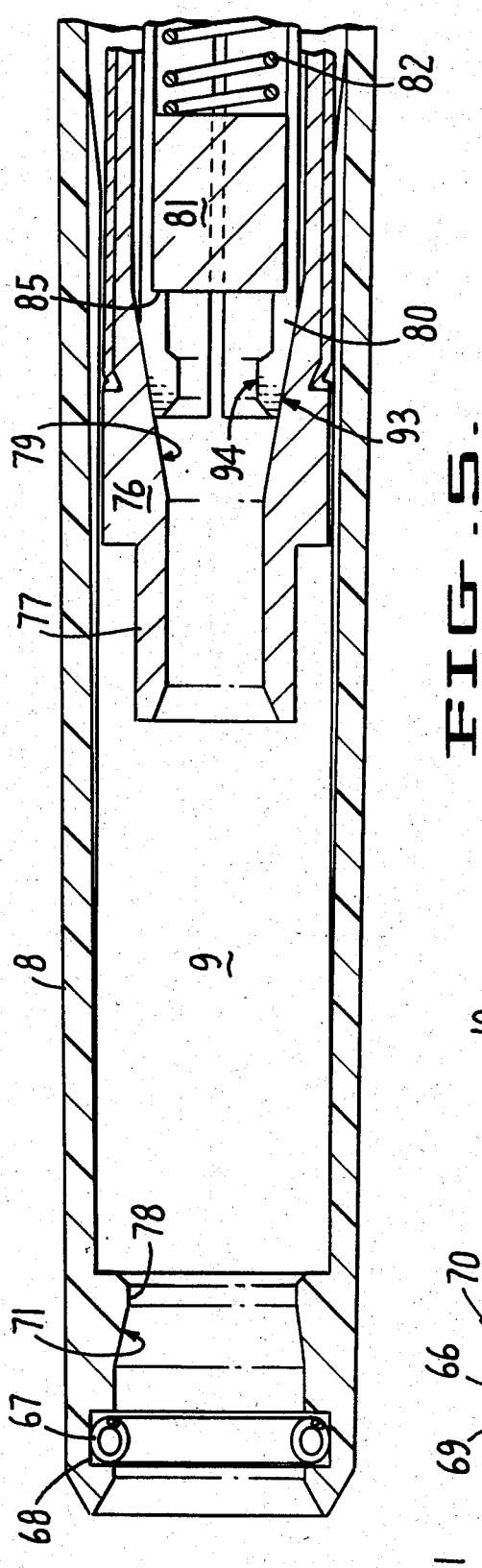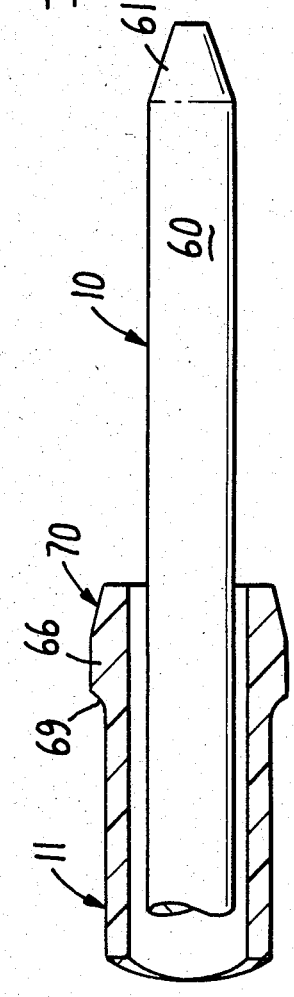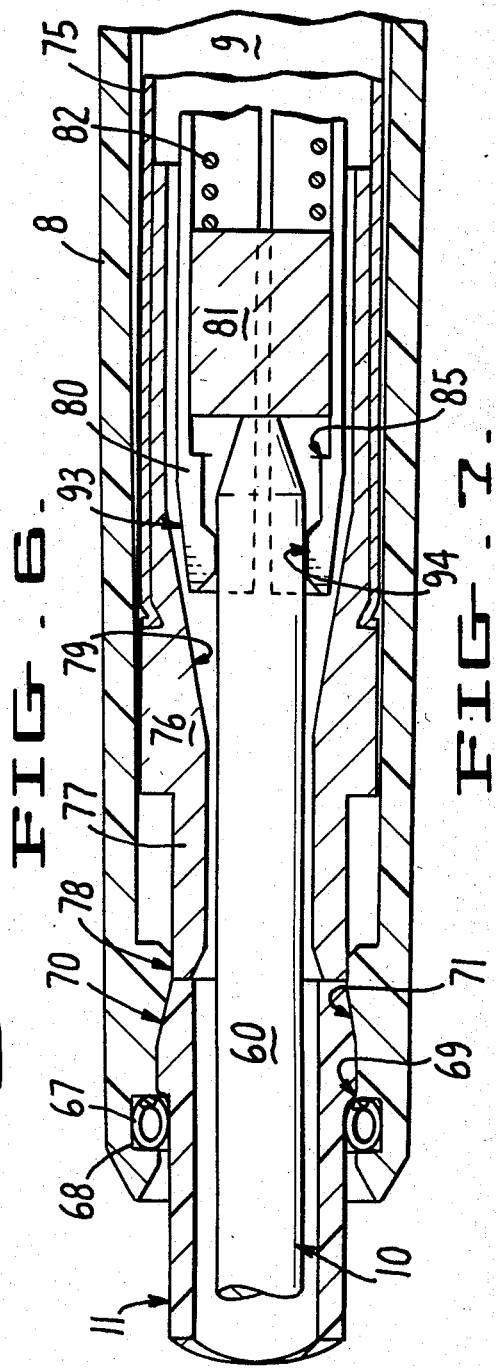

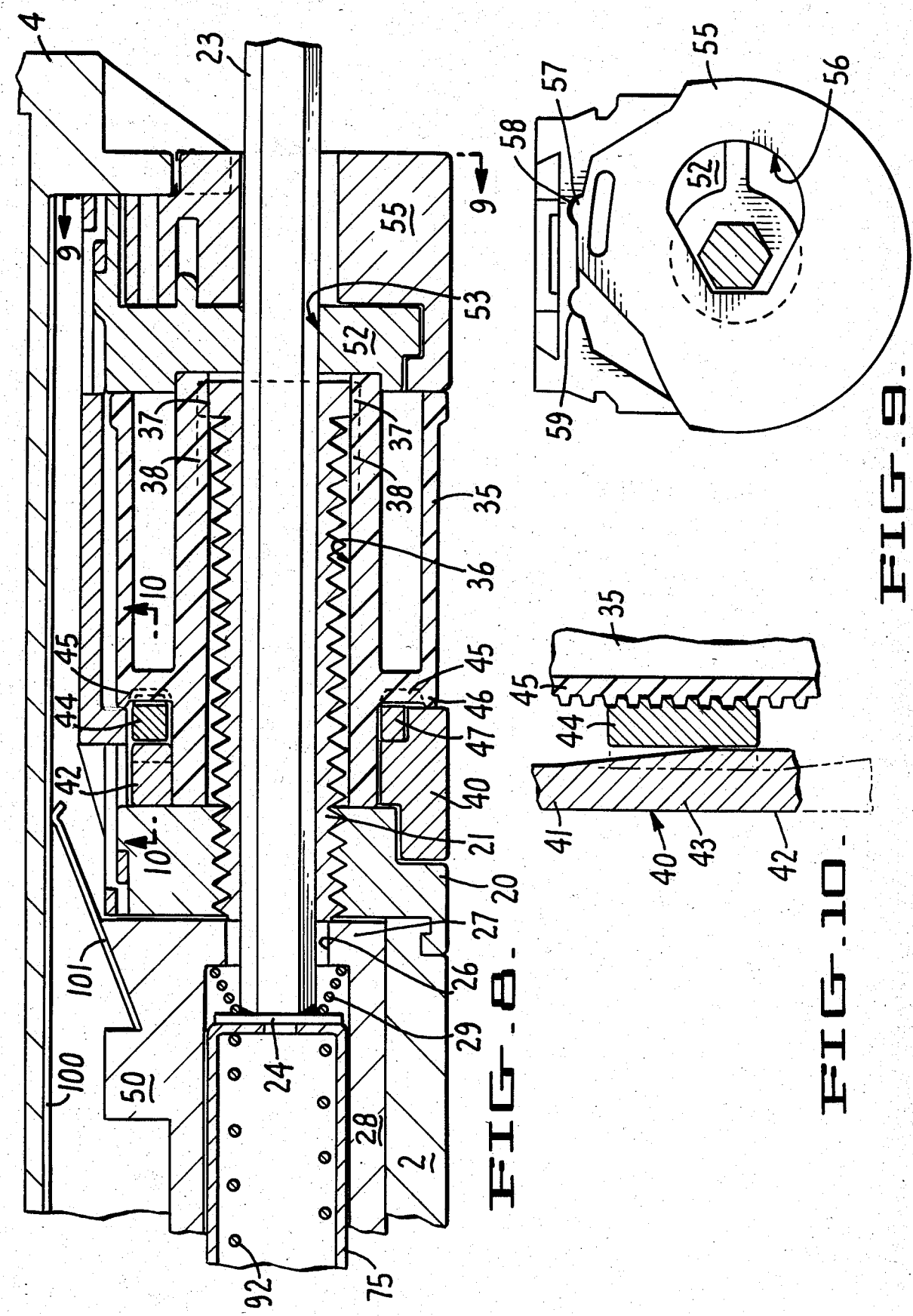

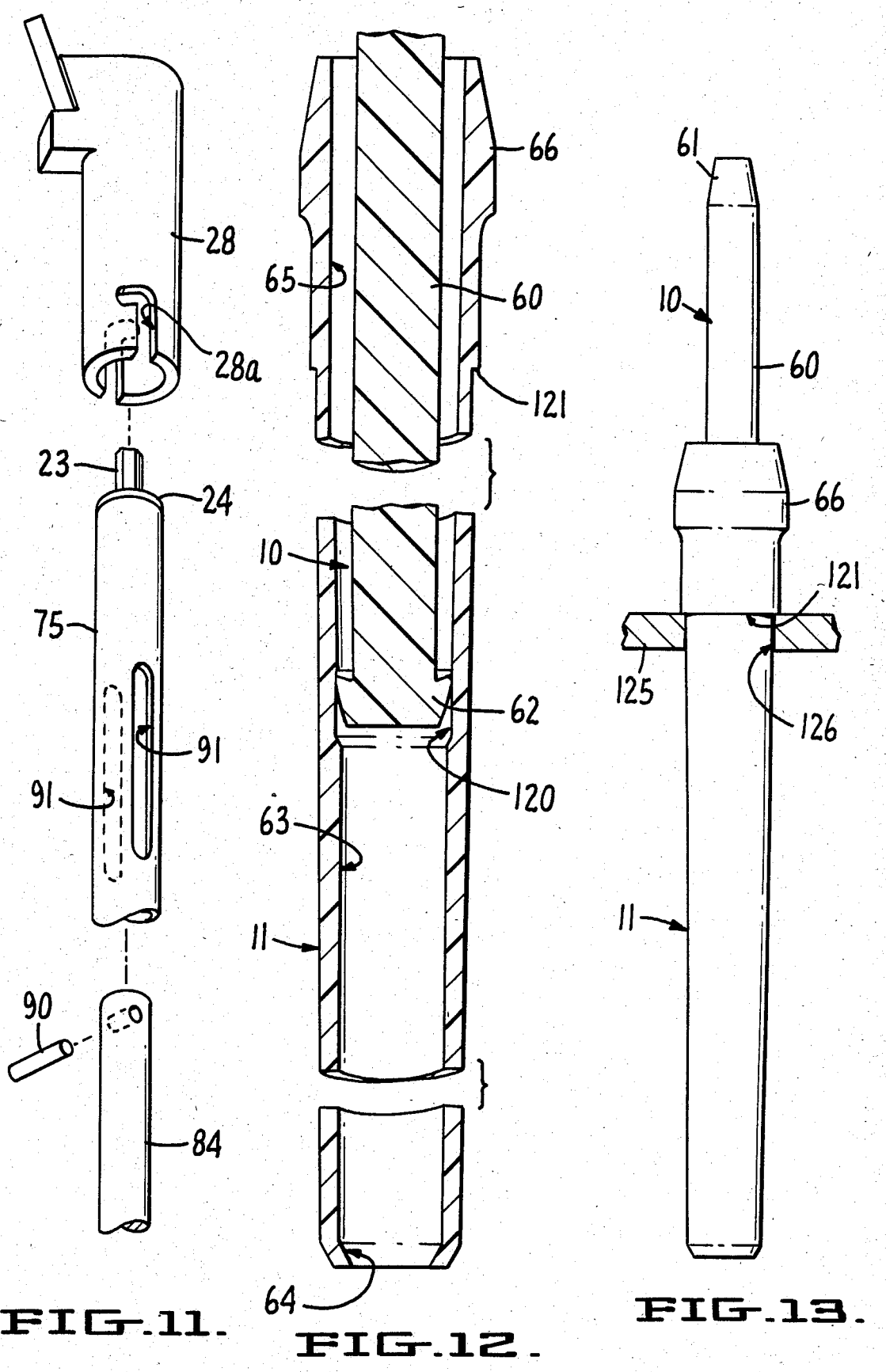

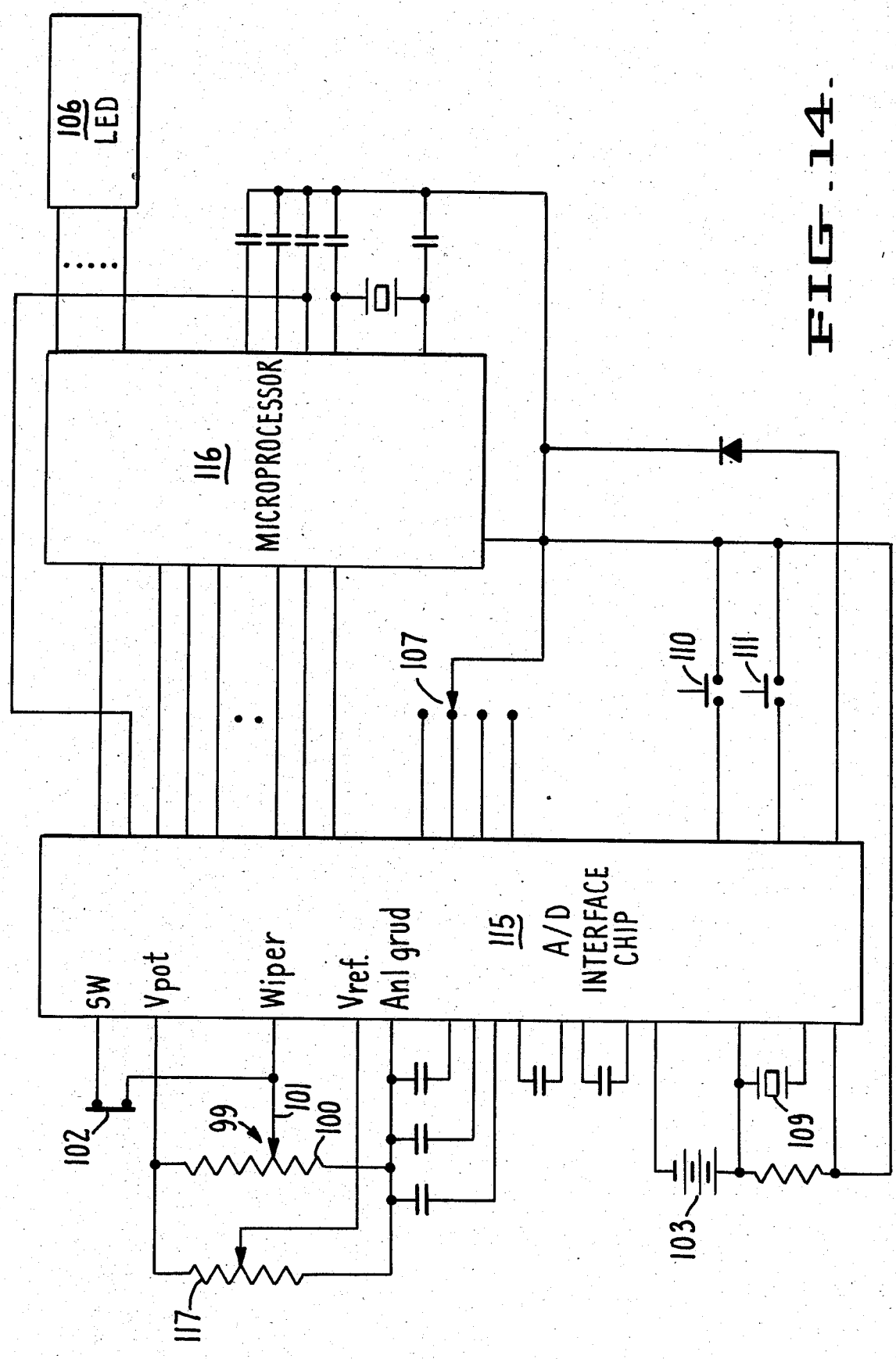
FIG._14.

HAND-HELD PIPETTE WITH DISPOSABLE CAPILLARY

This invention relates generally to a hand-held pipette with disposable capillary and more particularly to a pipette having a handle, a replaceable and disposable capillary tip assembly and a body extender to provide an interface between the tip assembly and handle.

BACKGROUND OF THE INVENTION

Laboratory techniques frequently require repetitious handling of very small samples of liquids, for example, in the range 1 to 250 microliters. Various pipetting devices are commercially available to simplify these otherwise laborious pipetting procedures. Some of the pipetting devices are described in the prior patent art including U.S. Pat. Nos. 3,606,086; 3,815,790; 3,827,305; 3,918,308; 4,054,062; and 4,084,730. Another commercially available device is illustrated in FIGS. 3 and 4. It includes a disposable, integral capillary and plunger tip assembly wherein the plunger tip is collet attached to an adjustable plunger stroking mechanism carried in the pipette handle to which the capillary is separately attached. In a first mode, the plunger stroking mechanism moves the capillary tip within the capillary for liquid pick-up or dispensing and in a second mode over-travels to permit ejection or attachment of the plunger tip and capillary assembly. A lead screw adjustment permits variation of the plunger stroke with a visual readout for the stroke setting.

Although some of the referenced patented devices use air displacement capillary tips, the device of FIGS. 3 and 4 employs only a positive displacement type capillary and plunger tip with collet-type attachment for the plunger tip and a stroke adjustment which may produce errors in calibration.

SUMMARY OF THE INVENTION

The described invention provides a means for continuous and accurate readout of the volumetric contents of the pipette which is independent of stroke adjustment and a calibration means and tip configuration which reduce errors in calibration to permit less rigorous manufacturing tolerances that do not affect the accuracy of operation.

The invention uses a first stop in a calibration or liquid pick-up and dispense mode as a zero reference point for measuring the desired plunger stroke. With the first mode stroke at the first stop, over-travel of the plunger shaft in a second mode enables ejection or attachment of an integral capillary and plunger tip assembly. That capillary and plunger tip assembly mounts upon the pipette with the plunger tip in its zero reference position and collet secured before any return movement commences. The plunger tip and capillary at the zero reference contain no fluid whatsoever. This insures that the plunger tip zero reference and volumetric measurement of the pick-up and dispense mode are synchronized. With the first stop as a zeroing reference, the pipette is automatically calibrated with the measuring system electronically and volumetrically zeroed. Elecronic display means counts up from the zero reference at the first stop to the other end of the variably adjusted first mode stroke. It displays the volume to which the stroke has been adjusted and thereafter may, for example, continuously display the volume of liquid contents in the pipette.

The principal object of this invention is to provide a pipette with a common body or handle which houses the volumetric stroking mechanism, control and display; a set of disposable capillary tip assemblies for a wide range of volumes; and a body extender providing an interface between the disposable tip assembly and body or handle that is easily removed for autoclaving or for exchange of body extenders having different functions such as so-called "repettor" or air displacement or positive displacement functions.

Another object of the invention is to provide an unbreakable, disposable, integral, positive displacement type tip assembly including a capillary with an interior peripheral shoulder and a plunger tip that are calibrated to a zero volumetric reference simply by attachment of the tip assembly to the body extender and the stroking mechanism within the body or handle.

Another object of the invention is to provide within the body or handle a plunger stroking mechanism which uses a first stop of a dispensing or pick-up mode as a zero reference for stroke adjustment and calibration.

An object of the invention is an electronic display selectively to readout continuously the volumetric contents of the pipette up to the calibrated stroke setting or to continuously display the volume of liquid dispensed up to that set volume.

Another object of the invention is to provide means for presetting an electronic display mounted on the pipette body to accommodate various size capillary and plunger tip assemblies.

One other object of the invention is to provide in the plunger stroking mechanism an over-travel arrangement which picks up the capillary and plunger tip assembly in a calibrated position without affecting the pipette volumetric zero reference.

Still another object of the invention is to provide a simple tip assembly ejection means that can be positively deactivated by an eject lock.

An object of the invention also is a stroke adjusting means that does not affect volumetric calibration and which may be locked at a particular volumetric setting.

Other objects and advantages of the invention will become apparent upon consideration of the following written description and the accompanying drawings.

BRIEF DESCRIPTION OF THE DRAWINGS

FIG. 1 is a perspective view of the hand-held pipette with a disposable, positive displacement type plunger tip and capillary;

FIG. 2 is a sectional view of the pipette of FIG. 1 taken along line 2—2 of FIG. 1;

FIG. 3 is a partial sectional view of a prior art adjustable stroke pipette with disposable, positive displacement type tip assembly;

FIG. 4 is an enlarged sectional view of the plunger tip collet for the prior art pipette of FIG. 3;

FIG. 5 is a sectional view of the body extender, collet and collet closure for the plunger tip assembly of the dispenser shown in FIGS. 1 and 2;

FIG. 6 is a view, partially in section, of the plunger tip and flanged end of the capillary which assemble to the components shown in FIG. 5;

FIG. 7 is a sectional view of the body extender, collet and collet closure of FIG. 5 in the eject mode of operation;

FIG. 8 is a sectional view of the stroke adjusting and eject locking means for the pipette of FIGS. 1 and 2;

FIG. 9 is an end view of the eject locking means taken along line 9—9 of FIG. 8;

FIG. 10 is a partial sectional view of the locking teeth of the adjusting screw lock means taken along line 10—10 of FIG. 8;

FIG. 11 is an exploded view of the collet closure tube, collet rod and encoder carrier assembly;

FIG. 12 is an enlarged sectional view of the plunger tip and capillary assembly;

FIG. 13 illustrates the plunger tip and capillary assembly seated on a mounting rack; and FIG. 14 is a schematic diagram of a form of electronic circuit used for calibration, display and indication of various operating states for the pipette of FIGS. 1 and 2.

DESCRIPTION OF PRIOR ART DEVICE IN FIGS. 3 AND 4

The pipette illustrated in FIGS. 3 and 4 includes a tubular body or handle 201 to which is threaded a body extender 208 that receives at one end an integral tip assembly including plunger tip 210 and capillary 211. A plunger shaft 223, hexagonal in section, manipulated by an operator's thumb on plunger button 225 slides in a hexagonal central bore 222 in adjusting lead screw 221 threaded in an adjusting nut 220 formed at one end of a central plunger cavity 203 in the body extender 208. A piston 224 at the end of plunger shaft 223 drives a collet rod 284 carrying at its opposite end a serrated collet 280 in opposition to a stiff collet closure spring 292 bearing on a shoulder of the collet rod and collet closure tube 275. A return spring 230 seated at one end upon a shoulder 231 formed in body extender 208 and seated at its other end on a shoulder 350 formed in collet closure tube 275 urges the plunger assembly to its fully retracted position shown. The collet closure spring 292 is stiffer than return spring 230 so it normally urges the collet closure 276 into engagement with the collet 280 to maintain it securely closed around the rod end 260 of the plunger tip 210 as the plunger assembly strokes in a pick-up and dispense mode.

The adjusting lead screw 221 can be threaded in adjusting nut 220 by manual rotation of the hexagonal plunger shaft 223 within the hexagonal central plunger bore 222. The adjusted stroking volume is displayed on mechanical micrometer means 351 within the pipette body 201 which is operable directly by the adjusting screw.

The illustrated capillary 211 has molded in one end annular retaining groove and rib 352 that seat upon corresponding annular retaining groove and rib 353 formed upon the end of body extender 208. The plunger tip 210 carries at one end a plunger head 262 that strokes within a precision molded portion 263 of the capillary 211 to pick up and dispense liquids as the plunger strokes. At one extreme end of the stroke, head 262 abuts shoulder 264 formed at the end of capillary 211. The head 262 has a necked-down end 354 which in that abutting position extends beyond the open end of capillary 211.

The plunger stroke in liquid dispensing or pickup mode is controlled at one end by abutment of the plunger piston 224 with the end of lead screw 221 and at the other end by abutment of collet closure 276 with the shoulder 231 in body extender 208 upon which the return spring 230 also bears. Further depression of the plunger shaft 223 by the operator then compresses the stiffer collet closure spring 292 and moves the collet 280 away from the stopped collet closure 276. This permits the collet to open as shown in hidden lines in FIG. 4 and the plunger head 262 abutting the shoulder 264 in capillary 211 forces capillary retainer groove and rib 352 out of engagement with retaining rib and groove 353 on the body extender 208 and thereby ejects the capillary 211 and plunger tip 210 assembly. Plunger tip pick-up is accomplished by assembling the capillary 211 to the body extender 208 with the collet open in the tip ejection mode shown in FIG. 4. This pushes a plunger tip flange 355 into engagement with the end of collet 280 in opposition to the direct pressure exerted by the operator's thumb on plunger button 225. Release of that pressure then closes the collet as it returns under force exerted by collet closure spring 292 into collet closure 276 with the plunger tip flange 355 and collet 280 as shown in solid lines in FIG. 4.

During pick-up, the plunger tip 210 moves the plunger head 262 from its abutment with capillary shoulder 264 until the collet becomes closed so that, when the collet closure 276 then retracts from shoulder 231 in the dispensing or liquid pick-up mode, the plunger tip head 262 may not be at a zero reference against capillary shoulder 264.

DESCRIPTION OF A PREFERRED EMBODIMENT

The embodiment of the invention illustrated in FIGS. 1 and 2 includes a molded plastic handle or body 1 having an elongated barrel 2 with a central plunger cavity 3 and a lid portion 4 extending generally at right angles to the barrel portion 2 upon which mount an electronic display and various indicating means described hereinafter. A body cover 5 encloses the related display electronics and provides a comfortable gripping surface for the operator's fingers below the display mounted upon the body lid 4.

An extender nut 6 threads upon mating threads 7 molded in the end of barrel portion 2 of the body 1 to secure to one end of the body a generally tubular body extender 8 which extends the central plunger cavity 3 of the body 1 as at 9 and carries at its free end the disposable, integral positive displacement type plunger tip 10 and capillary 11 assembly shown in FIG. 2.

The end of the central plunger cavity 3 remote from body extender 8 has a threaded stroke adjusting nut 20 secured to the barrel portion 2 of the body 1. An adjusting screw 21 threads through the adjusting nut 20 and has a central circular bore 22 through which passes plunger shaft 23 carrying at one end piston 24 and at its other end a plunger button 25 for stroking manipulation by the thumb of the operator's hand. The plunger shaft 23 protrudes through a hole 26 in the end 27 of encoder carrier 28 within the central plunger cavity 3 of the body. The plunger shaft 23 is resiliently connected to encoder carrier 28 by means of conical thrust lock spring 29 bearing upon the plunger piston 24 and the end 27 of the encoder carrier 28.

Return spring 30 seated at one end upon a shoulder 31 formed by the end of tubular body extender 8 and at the other end upon encoder carrier 28 urges the plunger assembly, including encoder carrier 28 and plunger shaft 23, to its normally retracted position wherein the encoder carrier 28 abuts adjusting screw 21 for stroke length control as shown in FIG. 2.

A knurled adjusting knob 35 having a smooth interior bore 36, which fits over the adjusting screw 21, threads the adjusting screw 21 through the fixed adjusting nut 20 by means of a pair of protruding ears 37 integral with the adjusting screw, each of which tracks in a separate longitudinal slot 38 formed along the adjusting knob interior bore 36. The adjusting screw is shown in its withdrawn position for maximum stroke length in FIG. 8 and in one extended position in FIG. 2.

The adjusting screw 21 can be locked at any position such as the partially extended one of FIG. 2 by means of an adjusting lock ring 40, more clearly illustrated in FIGS. 8 and 10. The adjusting lock ring 40 has a low cam portion 41, a high cam portion 42 and a ramp cam portion 43 which connects them. The high cam portion 42 moves a separate toothed lock segment 44 into engagement with mating teeth 45 carried along a circular annulus in one end of the knurled adjusting knob 35. The low cam portion 41 permits the teeth of segment 44 and 45 to disengage. The adjusting lock ring 40 is guided through a small arc of travel between one end of adjusting nut 20 and an abutment 46 on knurled adjusting knob 35. A retainer segment 47 retains the lock segment 44 in position over the lock ring ramp portion 43 and the low and high cam portions 41,42 adjacent to it.

In a first calibration or liquid draw-up and dispense mode, the operator by depressing plunger button 25 with a manipulating thumb may stroke the plunger assembly from the position shown in FIG. 2 or FIG. 8 that is adjustably set by stroke adjusting screw 21 to the other stroke end which is fixed and established by an abutment 50 on the encoder carrier 28 which at the end of that dispensing stroke abuts a first stop 51 on the body barrel portion 2. The length of the stroke can be adjusted by releasing the adjusting lock ring 40 and turning the knurled adjusting knob 35 to advance or retract the adjusting screw 21 through adjusting nut 20.

In its second tip eject or attachment mode, travel of the encoder carrier 28 is restrained by the interference of abutment 50 and first stop 51. However, the plunger shaft 23 may overtravel further forward through the hole 26 in the encoder carrier end 27 if the eject lock shown in FIGS. 8 and 9 is not in place. The eject lock prevents plunger shaft over-travel. It includes an eject lock housing 52 having a central bore 53 of a diameter sufficient to permit passage of plunger shaft 23 but not sufficient to permit passage of the larger diameter cylindrical end 54 of plunger button 25. The eject lock is set by a shiftable eject lock plate 55 to prevent over-travel of the plunger shaft 23 more than slightly beyond the end of the dispense stroke with abutment 50 and stop 51 engaged. The eject lock plate has an eccentric hole 56 which in the position shown in FIG. 9 is not axially aligned with and does not permit passage of the cylindrical end 54 of the plunger button 25. This restrains motion of the plunger shaft 23 to that which is slightly beyond the stroke end determined by encoder carrier abutment 50 and body stop 51. In the eject unlocked position, protrusion 57 on the eject lock plate 55 moves from the lock detent 58 as shown in FIG. 9 to unlock detent 59 to hold the plate unlocked. In that latter position, the eccentric hole 56 in the eject lock plate 55 is concentric with the plunger axis and its larger diameter permits passage of the smaller cylindrical end 54 of the plunger button. This enables over-travel of the plunger shaft 23 in a second mode for capillary and plunger tip attachment or ejection.

FIGS. 5, 6 and 7 illustrate the attachment and eject mode for the positive displacement plunger tip and capillary assembly shown in FIGS. 1 and 2. The plunger tip 10 includes an elongated rod portion 60 having a chamfered end 61 and the other end formed with a plunger tip head 62 that fits tightly within the precision molded bore 63 of the capillary 11. The end of the capillary 11 adjacent to the precision molded bore 63 has an interior peripheral shoulder 64 against which the plunger tip head 62 abuts in its fully extended position with the plunger tip head 62, the extremity of which extends slightly beyond the end of capillary 11. The length of bore 63 of the capillary is at least commensurate with the plunger stroke. Adjacent to the precision molded bore 63 the capillary has a generally tapering bore 65 enlarging to the connecting end of the capillary which carries a flange 66 that fits within the open end of extender body 8. A canted annular spring 67 mounted in an annular groove 68 formed in the end of the extender body 8 holds the capillary at shoulder 69 with the beveled face 70 of flange 66 seated tightly against the corresponding beveled seat 71 formed in the extender body end.

The plunger tip 10 and capillary 11 are an integral disposable assembly. A set of them may be dimensioned so as to provide a wide range of pipetting capacities. For example, the embodiment shown is a 250 microliter assembly plunger tip made from polyethylene, polypropylene, polymethylpentane or similar inert and semi-rigid with the rod portion 60 0.125 inches in diameter and the head 62 having its largest diameter at $0.1408 \pm 0.0005$ inches to fit within a capillary having its precision molded bore 63 at $0.1393 \pm 0.0004$ inches in diameter. The interior angle of the peripheral shoulder 64 of the capillary is at 30° and mates with an identical 30° chamfer on the plunger tip head 62. The chamfer 61 enables the plunger tip 10 to be inserted easily into the collet closure assembly shown in FIGS. 2, 5 and 7. Other dimensional relationships between capillary bore 36 and plunger tip head 62 are employed for others of a set of tip assemblies to a range of pipetting capacities.

As is further illustrated in FIGS. 2, 12 and 13, the capillary 11 is of enlarged diameter at a "parking place" 120 slightly in excess of the diameter of the head 62 of the plunger tip adjacent to the precision molded bore 63 remote from interior peripheral shoulder 64. During non-use and storage in the parking place 120, the plunger tip head 62 is not under compression as it would be within the precision molded bore 63 that has a smaller diameter than the head 62. Storage in the parking place prevents the plunger tip head 62 from cold forming to a smaller diameter that otherwise would affect the tight fit required as the head strokes within the precision molded bore 63 of the capillary. Also, as shown more particularly in FIGS. 12 and 13, the outer periphery of the capillary has a rack mounting step 121 for abutment with a rack 125 perforated as at 126 within which the capillary and plunger tip assemblies can be mounted with the plunger rod 60 protruding upwardly for stab type attachment to the pipette body of a new capillary and plunger tip assembly as hereinafter described.

The collet closure means includes a collet closure tube 75 which at one closed end abuts piston 24 of the plunger shaft 23 and at its other end carries a collet closure 76. The collet closure 76 has a neck 77 that in the capillary eject mode moves into the throat 78 at the end of body extender 8 by over-travel of the plunger shaft to extned the collet closure tube 75 into the position shown in FIG. 7. In that eject mode, the neck 77 of the collet closure 76 passing through throat 78 abuts capillary 11 and forces it off the extender body despite the retention force provided by canted spring 67. In this eject position of FIG. 7, the conical closure surface 79 of the collet closure 76 moves away from the serrated collet 80 both to permit ejection of an already attached capillary and plunger tip assembly and to enable insertion of a new plunger tip 10 into the serrated collet 80 against collet seat 81 as shown in FIG. 7. Collet seat 81 is spring biased by a light force spring 82 bearing against collet seat 81 and the threaded end 83 of collet rod 84 to which the collet 80, itself, threads. The light force collet spring 82 through collet seat 81 pushes the plunger tip 10 to the end of the mounted capillary 11 with plunger tip head 62 in engagement with capillary interior peripheral shoulder 64 and slightly beyond the end of the capillary. Collet shoulder 85 retains the spring biased collet seat 81 in the unloaded condition of FIG. 5.

Collet rod 84 by means of collet pin 90 is pinned to encoder carrier 28 in a bayonet type thrust lock slot 28a with the pin 90 passing through a pair of diametrically opposed elongated slots 91 formed in collet closure tube 75 as shown in more detail in FIG. 11. Thrust lock spring 29 holds the assembly together. The collet rod 84 is normally urged by collet closure spring 92 into the collet closed position shown in FIGS. 2 and 5. The collet closure spring 92 bears at one end against the closed end of the collet closure tube 75 and at the other end against the collet closure rod 84 urging the conical collet surface 93 into resilient engagement with the similarly conical closure surface 79 of collet closure 76. The conical collet closing surfaces pinch the serrated collet internal bore 94 together to hold the plunger tip 10 firmly in place against collet seat 81. Collet closure spring 92 is stiff in comparison with return spring 30, so that during the calibration or pick-up and dispensing mode, spring 92 forces the collet closure and collet surfaces 79,93 firmly together.

In this first mode, as described earlier, the plunger assembly strokes between adjusting screw 21 at one end and engagement between encoder abutment 50 and first stop 51 at the other. This engagement prevents further compression of return spring 30 and enables compression of the stiffer collet closure spring 82. In the second eject or attachment mode, with the eject lock not in place, the operator can then extend the plunger to overtravel against the collet closure spring 82 and move the collet closure 76 from the position shown in FIG. 5 to that in FIG. 7 and thereby eject an attached plunger tip and capillary assembly or enable pick up of a new one.

The capillary 11 and plunger tip 10 assemblies may be rack mounted vertically on a laboratory bench or other support with the plunger rod 60 protruding upwardly. Attachment of a new capillary and plunger tip assembly then is easily done simply by pushing the pipette body 1 down with the plunger shaft 23 and collet closure 76 in the over-travel position of FIG. 7. This engages the beveled flange face 70 of the capillary 11 against beveled seat 71 in the body extender 8. The capillary flange 66 is held in seated relationship by canted spring 67 bearing against capillary shoulder 69. Release of the plunger shaft then closes the collet 80 around the rod portion 60 of the plunger tip 10. The collet gripping position on the rod portion 60 is not critical because the plunger tip head 62 has already been and remains seated at a zero volumetric reference against capillary shoulder 64 by means of the bias of collet spring 82 against collet seat 81. The plunger tip does not move during collet closure. Then, further release of the plunger shaft 23 moves the stroking mechanism through the zero volumetric reference at the first stop 51 with the plunger tip and capillary in synchronism at their zero reference, too.

The electronic aspects of the described embodiment acquire, process and display data related to the volume of liquid being transferred by the pipette. Volume is derived from a linear incremental position sensing means for the plunger assembly. It comprises a potentiometer 99 having a linear resistive element 100 distributed within the pipette body barrel 2 along the plunger assembly stroke within the central plunger cavity 3. Potentiometer wiper 101 carried by the encoder carrier 28 is biased against the resistive element 100 to derive a voltage which is proportional to linear displacement of the plunger assembly with respect to the zero volumetric reference with carrier abutment 50 engaged with the first stop 51. That mechanical engagement is detected by zero volume switch 102 which closes when engagement occurs. Battery 103 powers the related electronics on circuit boards 104,105 mounted within body cover 5.

The block diagram of FIG. 14 illustrates schematically one version of electronics mounted on boards 104,105 to operate a liquid crystal display 106 on body lid 4. In a "volume contained" mode, the liquid crystal continuously displays the instantaneous volumetric content of the pipette up to the volume set by adjusting screw 21. Slide switch 107 also on the body lid 4 selects the volume range for a particular one of a set of four capillary-plunger tip assemblies used in the described embodiment. The illustrated electronics also may provide a timer function as at 108 or in another mode displayed on the liquid crystal 106. An alarm function on the body lid may be provided by piezoelectric beeper 109. The body lid 4 also mounts appropriate on-off push button 110 and mode select push button 111.

The electronics illustrated in FIG. 14 include a CMOS gate array device 115 which provides an interface between microprocessor 116 and the linear potentiometer 99. The gate array device 115 converts the analog voltage developed by potentiometer 99 which is proportional to the stroking distance of travel of the plunger assembly from abutment at the first stop 51 to digital values supplied to the microprocessor. The gate array device 115 includes a dual slope analog to digital converter which operates in a ratiometric mode to provide a latched digital output which is indicative of the analog voltage supplied by the linear potentiometer 99. A trimmer potentiometer 117 adjusts the wiper-displacement/converter-count ratio by adjusting the converter full-scale reference voltage.

In the "volume contained" mode, liquid crystal 106 displays the increasing pipette volume as the finger button 25 is released from the zero reference at first stop 51 to the upper stroking limit set by adjusting screw 21 where the display reads the pipette volume setting. As the finger button then is depressd, the display reads the decreasing pipette volume of liquid contained in the pipette until the zero volume position again is reached at first stop 51. There the zero volume switch 102 resets the display 106 to zero.

In a "timer" mode, the operator may set the selected time interval shown on timer 108 which is continuously counted down in the display 106 by microprocessor 116 until an audible signal may be activated such as piezoelectric beeper 107. The display resets to the original interval to begin another cycle.

A variety of software routines and hardware components may be employed to provide the described functions within the scope of the invention defined in the following claims.

We claim:

1. In a pipette having a body carrying a plunger assembly for manual stroking in a liquid pick-up and dispense mode to one stroke-end at a first stop, the improvement comprising
   electrical switch means on said stop to detect the presence of said plunger assembly at said stroke-end;
   linear position sensing means developing an electrical signal porportional to the distance said plunger assembly strokes from said first stop; and
   means converting the electrical signal from said linear position sensing means to a continuous display of stroking volume.

2. The pipette of claim 1 wherein the display is the volume of liquid contained in the pipette.

3. The pipette of claim 1 further comprising
   means sensing the other end of the plunger assembly stroke and resetting the display to zero volume; and
   means converting the electrical signal from said linear position sensing means to a continuous display of the volume of liquid dispensed.

4. The pipette of claim 1 further comprising an adjusting nut on the body;
   an adjusting screw threaded in the adjusting nut; and
   an adjusting knob for turning the adjusting screw in the adjusting nut to adjust the length of the plunger assembly stroke with respect to said first stop.

5. The pipette of claim 4 further including a mechanical lock selectively to prevent the adjusting knob from turning said adjusting screw.

6. The pipette of claim 1 wherein the linear position sensing means includes a potentiometer comprising
   a linear resistive element distributed on the body along the stroke of said plunger assembly; and
   a wiper in electrical contact with the resistive element and carried by the plunger assembly.

7. The pipette of claim 1 further comprising microprocessor means for converting the electrical signal from said linear position sensing means to a continuous display of volume for any one of a set of disposable capillary and plunger tip assemblies having different volumetric capacities.

8. In a pipette having a body carrying a plunger assembly including a plunger shaft for manual stroking in a liquid pick-up and dispensing mode to one stroke-end at a first stop, a plunger tip holding collet on the plunger assembly, a body extender connected to the body and having a capillary receiving end near said collet, an improved disposable capillary and plunger tip assembly comprising (a) a capillary having a precision molded internal bore, an internal peripheral shoulder adjacent that bore at one end of the capillary, a flange carrying a beveled seating face at the other end of the capillary for releasable mounting upon the receiving end of said body extender; and (b) a plunger tip having a head at one end for reciprocation within the precision molded bore of the capillary and a rod shaped end for insertion in said collet.

9. The pipette of claim 8 further including a spring biased collet seat on the plunger assembly for urging the plunger tip head into abutment with the interior peripheral shoulder of the capillary.

10. The pipette of claim 9 further comprising
    a collet closure;
    a collet closure tube carrying the collet closure in shiftable relation to said collet; and
    a collet closure spring compressible by over-travel of the plunger shaft and arranged to open and close the collet only when said plunger assembly is at said one stroke end at said first stop.

11. The pipette of claim 10 further comprising eject lock means for restraining over-travel of said plunger assembly beyond said first stop.

12. The pipette of claim 10 wherein the collet closure spring urges the collet closure toward said first stop in order to close said collet.

13. The pipette of claim 10 further comprising an eject lock selectively to restrain over-travel of said plunger shaft.

14. In a pipette having a body carrying a plunger assembly for manual stroking in a liquid pick-up and dispense mode, a body extender connecting the body and having a capillary receiving end surrounding an internal bore, the improvement comprising
    a beveled seat around said bore at the receiving end of said body extender;
    a capillary having a flanged end with a beveled seating face corresponding to said beveled seat of the body extender;
    and a canted annular spring secured within an annular groove at the end of said body extender to hold the seating face of the capillary flange against the seat of said body extender.

15. The pipette of claim 14 further comprising
    a plunger tip holding collet on the plunger assembly; and
    a collet closure for said collet having a necked down portion that is shiftable through the body extender bore to eject a seated capillary from the receiving end of said body extender.

16. The pipette of claim 15 wherein shifting of the neck of said collet closure beyond that needed to eject said capillary is restricted by a shoulder adjacent to said body extender bore.

17. A disposable capillary and plunger tip assembly for a pipette including (a) a capillary having a precision molded internal bore and a parking place bore adjacent that precision molded bore which has a diameter larger than the precision molded bore; and (b) a plunger tip having a head for reciprocation within the precision molded bore of the capillary which is of a diameter larger than the precision molded bore but smaller than the parking place bore.

18. The disposable capillary and plunger tip assembly of claim 17 further including a rack mounting step around the exterior of the capillary.

* * * * *